Patented Feb. 4, 1930

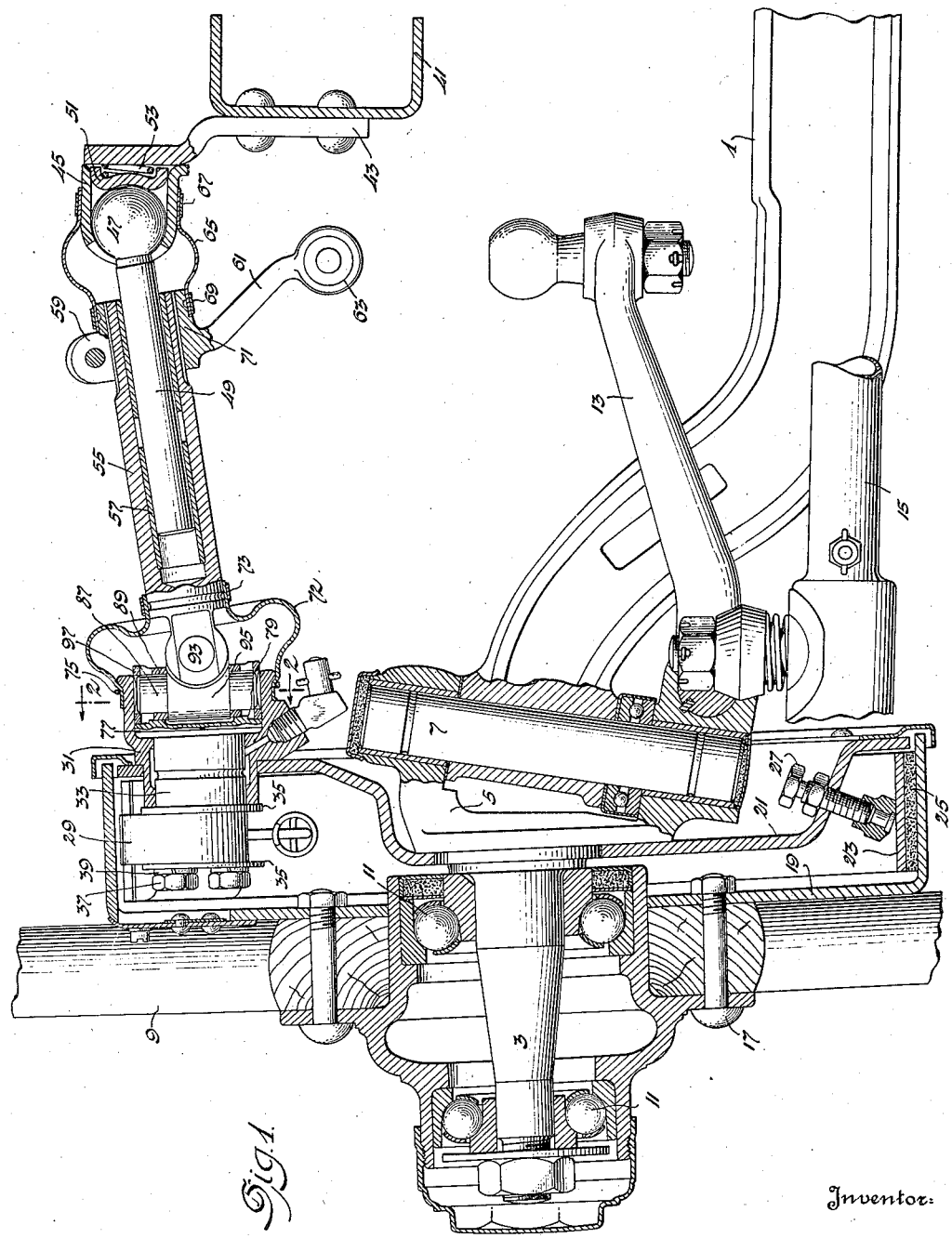

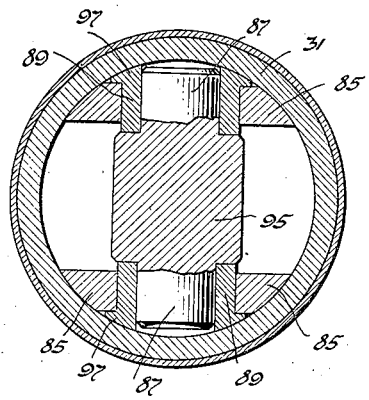
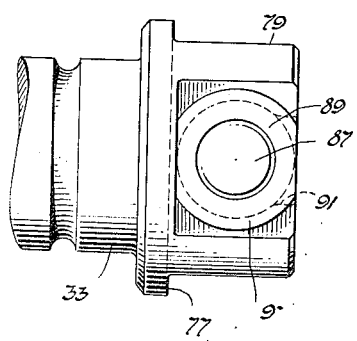
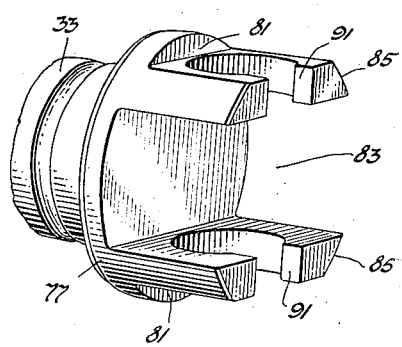
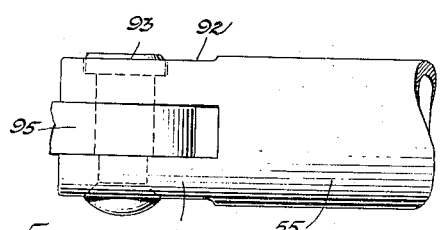

1,746,212

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

FRONT-WHEEL-BRAKE JOINT

Application filed September 11, 1926. Serial No. 134,934.

This invention relates to brakes and is particularly concerned with front wheel brakes for vehicles.

An object of the invention is to provide an improved operating means for a front wheel brake involving an improvement in the universal joint located substantially in alignment with the wheel spindle pivot.

Other objects will be understood upon a reading of the following description together with an examination of the accompanying drawing.

In the drawing:

Figure 1 is a vertical section showing the pivoted connection between the wheel spindle and the front axle.

Figure 2 is a section on line 2—2 of Figure 1.

Figure 3 is a plan view looking down upon the yoke end of the cam shaft, (the sleeve associated therewith being removed).

Figure 4 is a perspective of the cam shaft.

Figure 5 is a detail of the operating shaft.

Referring by reference characters to the drawing, numeral 1 represents the axle, the axle being a front axle of the vehicle. A wheel spindle 3 is constructed as a part of a knuckle 5 pivotally mounted by pivot 7 with axle 1. Upon the spindle 3 is rotatably mounted a wheel 9, suitable bearings 11 being shown. The steering arm is illustrated at 13 and a tie rod at 15. Bolted at 17 to the wheel is a brake drum 19. Carried by the knuckle is a closure plate or shield 21. Within the drum is a brake band 23 having a lining 25, suitable means being provided as at 27 to limit the release movement of the brake band under the influence of its spring, not shown.

For operating the brake there is as usual a cam 29 for expanding the ends of the band and causing its frictional engagement with the drum. As shown in the drawing, there is a bearing sleeve 31 carried by the shield plate, and within this bearing sleeve is rotatably mounted a shaft 33 which carries the cam 29, suitable retainers 35, screws 37 and washers 39 completing the assembly, and holding the shaft in correct longitudinal position relative to the sleeve for applying the brake to the drum.

For actuation of the brake there is riveted to a vehicle frame 41 a bracket 43 to which is secured a socket 45. Within the socket is a ball 47 on the end of the rod 49. A disc 51, with a surface to conform to that of the ball 47, is pressed against the ball by a spring 53 to secure a close fit between the ball and the socket and to prevent noise. Telescopically mounted on rod 49 is a hollow shaft 55, a bushing 57 located between the shaft and the rod. Upon shaft 55 is secured by a split clamp 59 a lever arm 61 having at its end means 63 for connection with the brake operating linkage. A boot of leather 65 is clamped as at 67 to the socket 45 and at 69 to the hub 71 of the lever 61. Substantially over the pivot bolt 7 is arranged a universal joint between shaft 55 and the yoke end of cam shaft 33. This joint is housed by a boot 72 clamped at 73 to the hollow shaft 55 and at 75 to the bearing sleeve 31.

The details of the joint above referred to constitute an important part of the invention and will now be described. The yoke end of the cam shaft 33 is enlarged to form a flange 77. The face of this end is machined, cutting out two diametrically opposite segments as at 81 and also machined to cut out a central portion 83, thus leaving two yoke arms 85. Each of these arms is bored out for the reception of a pin 87 and a bushing 89. The diameter is such as to reach the edge of the arms which are then cut away at 91 sufficiently for the entry of pin 87 but not enough to admit the bushing 89. The adjacent end of the tubular shaft 55 is forked as at 92 to receive a pin 93 extended at right angles to the trunnion pin 87. Between the end of shaft 55 and the yoke on the end of the cam shaft 33 is a spider member 95 which carries the diametrically opposite trunnion pins 87. The spindle is extended laterally from pins 87 and engages between the forked ends of shaft 55, and when so positioned it is pivotally connected to shaft 55 by the pin 93. In assembling the spider 95, its trunnion pins 87 are moved through the open ends of the yoke members of the cam shaft end, and the bushings are thereafter assembled from the outside by moving them longitudinally on trunnion pins 87. This arrangement effects a pivotal connection between the cam shaft and the spider and the bushings serve to prevent a separation of the parts of the joint.

It will be observed that these bushings are somewhat enlarged at one end, as at 97, and the enlargement is flatted to engage the wall of the yoke and thereby the bushing is held from rotation. After assembly the shaft is moved into position within the sleeve 31 and there secured by the retaining means 35, 37 and 39. When so secured in position the cam is in operative relation to the brake band and also the enlarged end of the bearing sleeve 31, encircles the end of the bushings 89 and retains them in position on the trunnion pins 87.

By the arrangement above described a simplified universal joint, and one easily assembled, is provided between the brake cam shaft and the brake operating shaft. It will be understood that this universal joint is positioned in functional relation with the shaft of the steering knuckle and that the telescopic parts of the operating shaft, together with the ball joint and the pivot 93, are employed in order that the relative movements of the steering axle and chassis frame may occur without disturbing the brake operating assembly.

I claim:

1. In a transmission device, a driving member, a driven member, a yoke and trunnion coupling between said members, a bushing on said trunnion to lock said trunnion to said yoke, and a sleeve surrounding said coupling to retain said bushing, the sleeve serving as a bearing for one of said members, and means to retain said member from longitudinal movement relative to said sleeve.

2. In a transmission device, a sleeve having an enlarged end, a shaft journalled in said sleeve, means to retain said shaft from longitudinal movement relative to said sleeve, a second shaft, a coupling between said shafts comprising a yoke and trunnion device within said enlarged end of the sleeve, a bushing surrounding the trunnion within said yoke, said sleeve retaining said bushing on said trunnion when said shaft is secured by its retaining means.

3. In a brake, an operating shaft, a rock shaft for actuating said operating shaft, coupling means for said shafts including a yoke on the end of one shaft, trunnion pins associated with a part connected to the other shaft, bushings for said trunnions, the bushings holding said trunnions assembled in said yoke, and a sleeve surrounding said coupling to retain said bushing in position together with a shield, said sleeve being mounted in said shield to journal said operating shaft.

4. In a brake, a shield, a bearing sleeve mounted therein, an operating shaft journalled in said sleeve and having a yoke at its end rotatable within the end of said sleeve, a rock shaft, coupling means for said shafts including trunnions rotatable within the arms of said yoke, bushings for said trunnions retaining said trunnions in said yoke, and means to retain said operating shaft in poistion longitudinally within said sleeve whereby the sleeve retains the bushing from radial movement off said trunnions.

5. In a brake, a shield, a sleeve mounted therein, an operating shaft journalled in said sleeve, a rock shaft, a joint between said shafts including a radially movable bushing to lock the parts of said joint, means to retain said operating shaft in operative position relative to said sleeve whereby the sleeve both journals said shaft and retains the bushing in position, and thereby prevents the separation of the parts of the joint.

In testimony whereof I affix my signature.

ROSCOE BERINGER.